(12) United States Patent
Chang et al.

(10) Patent No.: US 10,353,521 B2
(45) Date of Patent: Jul. 16, 2019

(54) MUTUAL-CAPACITANCE TOUCH SCREEN

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/393,614

(22) Filed: Dec. 29, 2016

(65) Prior Publication Data

US 2017/0192561 A1    Jul. 6, 2017

(30) Foreign Application Priority Data

Dec. 31, 2015 (TW) .............................. 104144642 A (51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04111* (2013.01)

(58) Field of Classification Search
CPC ............... G06F 3/044; G06F 2203/041–04113
USPC ..................... 178/18.01–19.07; 345/173–178
See application file for complete search history.

(56) References Cited

U.S. PATENT DOCUMENTS

2014/0192009 A1    7/2014 Lai et al.
2015/0160759 A1*  6/2015 Lien ....................... G06F 3/044
                                                            345/174

FOREIGN PATENT DOCUMENTS

TW          201428565          7/2014

* cited by examiner

*Primary Examiner* — Michael Pervan
(74) *Attorney, Agent, or Firm* — WPAT, PC (57) ABSTRACT

The present invention provides a mutual-capacitance touch screen comprising multiple parallel first electrodes and multiple parallel second electrodes coupled to a touch sensitive processing apparatus; and a covering layer for covering the first and the second electrodes, wherein a thickness of the covering layer and a third distance between one of the first electrodes and an adjacent second electrode form a third ratio range.

7 Claims, 6 Drawing Sheets

MUTUAL-CAPACITANCE TOUCH SCREEN

CROSS REFERENCES TO RELATED APPLICATIONS

This application claims benefits of Taiwan patent application, No. 104144642, filed on Dec. 31, 2015, the disclosures which are incorporated herein by reference.

BACKGROUND OF THE INVENTION

1. Field of the Invention

The present invention relates to the field of capacitance touch screen, and more particularly, to a structure of mutual-capacitance touch screen.

2. Description of the Prior Art

Touch screens (or panels) are one of the main input/output devices of modern electronic apparatuses, such as tablet computers, smart mobile phones, all-in-one computers, demo machines, and etc., and most of them use the touch screen as their main human/machine interface. There are many kinds of touch screens, and the capacitance touch screen is applied to many occasions, it is one of the mainstreams of touch sensitive (or controlling) methods.

However, it is not easy for a mutual-capacitance touch screen to detect slight capacitance variations in an interfered environment. Therefore, a good design for the mutual-capacitance touch screen is urgently desired, it could make a capacitive touch device have a better signal-to-noise ratio (SNR) when the capacitive touch device detects an external conductive object approaching to or touching on the screen thereof, so that a better detection accuracy can be achieved.

SUMMARY OF THE INVENTION

For solving the problem of detecting slight capacitance variations in an interfered environment in order to get a good signal-to-noise ratio (SNR), the present invention provides a better design for a mutual-capacitance touch screen. It makes a capacitive touch device have a better signal-to-noise ratio when the capacitive touch device detects an external conductive object above or on the screen, in order to achieve a better detection accuracy.

The present invention provides a mutual-capacitance touch screen including multiple parallel first electrodes and multiple parallel second electrodes respectively coupled to a touch sensitive processing apparatus; and a covering layer for covering the first and the second electrodes, wherein a thickness of the covering layer and a third distance between one of the first electrodes and an adjacent second electrode form a third ratio range.

In some embodiments, a first distance between two adjacent first electrodes of the first electrodes and the third distance form a first ratio range.

In some embodiments, a second distance between two adjacent second electrodes of the second electrodes and the third distance form a second ratio range.

In some embodiments, the thickness of the covering layer and a permittivity of the covering layer form a liner relationship when the third ratio range maintains constant.

In some embodiments, when a permittivity of the covering layer is 7, the third ratio range is shown as the following table, wherein the third distance mapping to the thickness of the covering layer has a flexible adjustment range of 30% level distances, the thickness of the covering layer mapping to the third distance has a flexible adjustment range of 30% level distances.

| Level | The thickness of the covering layer (mm) | The third distance (mm) |
|---|---|---|
| 1 | <=2 | 0.50 |
| 2 | 3 | 0.61 |
| 3 | 4 | 0.70 |
| 4 | 5 | 0.79 |
| 5 | 6 | 0.86 |
| 6 | 7 | 0.93 |
| 7 | 8 | 1.00 |

In some alternative embodiments, if the third distance is mapping to a N-th level, where N is a natural number from 2 to 6, the thickness of the covering layer is between an upper bound and a lower bound, where the lower bound is calculated as the thickness of the covering layer corresponding to the N-th level−((the thickness corresponding to the N-th level−the thickness corresponding to the N−1th)*30%), where the upper bound is calculated as the thickness of the covering layer corresponding to the N-th level+((the thickness corresponding to the N+1th level−the thickness corresponding to the N-th level)*30%).

In some alternative embodiments, if the thickness of the covering layer is mapping to a N-th level, where N is a natural number from 2 to 6, the third distance is between an upper bound and a lower bound, where the lower bound is calculated as the third distance corresponding to the N-th level−((the third distance corresponding to the N-th level−the third distance corresponding to the N−1th)*30%), where the upper bound is calculated as the third distance corresponding to the N-th level+((the third distance corresponding to the N+1th level−the third distance corresponding to the N-th level)*30%).

In some embodiments, the first or the second ratio range is about 8-12 times.

In some embodiments, the first and the second electrodes are on a same single transparent electrode layer.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figures 1A, 1B, 1C, 1D:
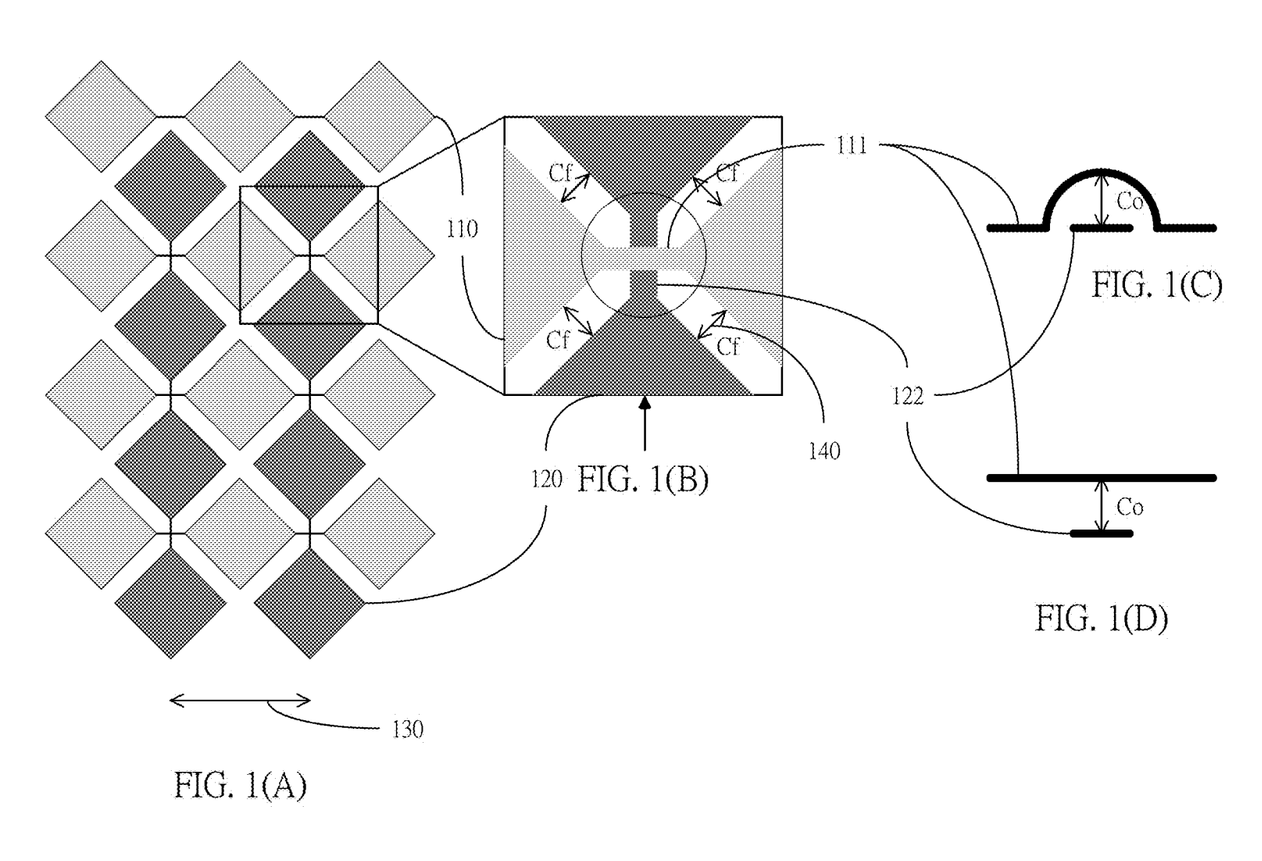
FIGS. 1(A) and 1(B) illustrate top-views of a capacitance touch screen according to an embodiment of the present invention.
FIGS. 1(C) and 1(D) depict cross sections of conductive lines of a capacitance touch screen according to an embodiment of the present invention.

Referring to FIGS. 1(A) and (B), top-views of a capacitance touch screen according to an embodiment of the present invention is illustrated. Each touch sensitive electrode of the capacitance touch screen may couple or connect to a touch sensitive processing apparatus to perform self-capacitance and/or mutual-capacitance touch detection. In FIG. 1(A), the touch screen includes two sets of electrodes being perpendicular to each other, which include one set of multiple parallel first electrodes 110 and another set of multiple parallel second electrodes 120. Every two adjacent first electrodes 110 and/or second electrodes 120 individually have a distance 130. Although FIG. 1 only shows the shape of conductive sheets of the electrodes in square, the person having ordinary skill in the art can appreciate that the shape of the conductive sheets in current technology may be implemented by the shapes of, such as long strip, rhomb, square, and etc. Moreover, the conductive sheets may extend to other electrodes being able to increase capacitive couple, such as round-spiral, square-spiral, etc., these extended electrodes may be arranged clockwise or counterclockwise. However, the first electrodes 110 and the second electrodes 120 applied to the present invention are not limited to the embodiment shown in FIG. 1.

In FIGS. 1(A) and (B), there is a conductive line used to connect each conductive sheet of each first electrode 110. Also, there is a conductive line used to connect each conductive sheet of each second electrode 120 as well. As those shown in FIG. 1(B), the conductive line 111 of the first electrode 110 is above the conductive line 122 of the second electrode 120, and a distance 140 is between a conductive sheet of the first electrode 110 and an adjacent conductive sheet of the second electrode 120. When the capacitance touch screen adopts the design of single-layered touch sensitive electrode as shown in FIG. 1(C), the conductive line 111 of the first electrode 110 is across the conductive line 122 of the second electrode 120. However, in some embodiments, the conductive line 122 may be across the conductive line 111. When the capacitance touch screen adopts the design of multi-layered touch sensitive electrode as shown in FIG. 1(D), the conductive line 111 of the first electrode 110 and the conductive line 122 of the second electrode 120 are intersected up and down.

For mutual-capacitance touch sensing, the touch sensitive processing apparatus provides touch sensitive signal to the first electrode 110. Since there is capacitive coupling between the second electrode 120 and the first electrode 110, the second electrode 120 will generate corresponding induced current and transmit it back to the touch sensitive processing apparatus. After signal processing, the touch sensitive processing apparatus can determine whether an external conductive object approaches or touches (or called approximate) the touch screen. The mutual capacitance between the first electrode 110 and the second electrode 120 is called Cmutual, called Cm for short. The mutual capacitance comes from two parts, the first part is the capacitance between the fringe of conductive sheet, called Cfringe, called Cf for short. The second part is the capacitance between the conductive lines 111 and 122, called Coverlap, called Co for short. Accordingly, a relation of Cm=Cf+Co can be obtained.

As design (manufacture) completely, the conductive lines 111 and 122 are buried or hidden under the touch screen, the capacitance (Co) of the conductive line will not be changed by the approximate event of the external conductive object. However, the fringe capacitance Cf will be changed by the approximate event of the external conductive object. This change affects the variation of the mutual capacitance Cm, and hence the touch sensitive processing apparatus can perform mutual capacitance detection according to this variation.

Figure 2A:
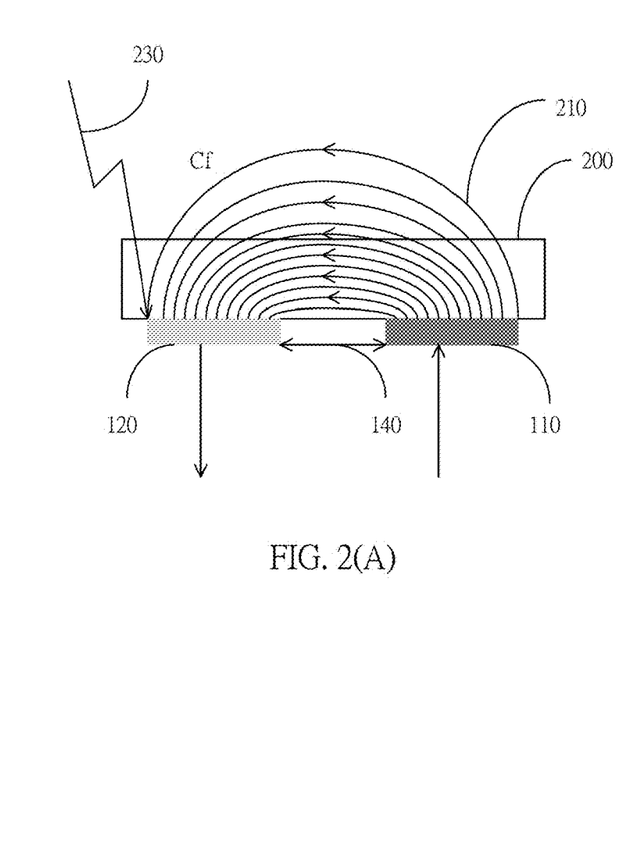
FIGS. 2(A) and 2(B) show an influence on fringe capacitance by an external conductive object according to some embodiments of the present invention.
Figure 2B:
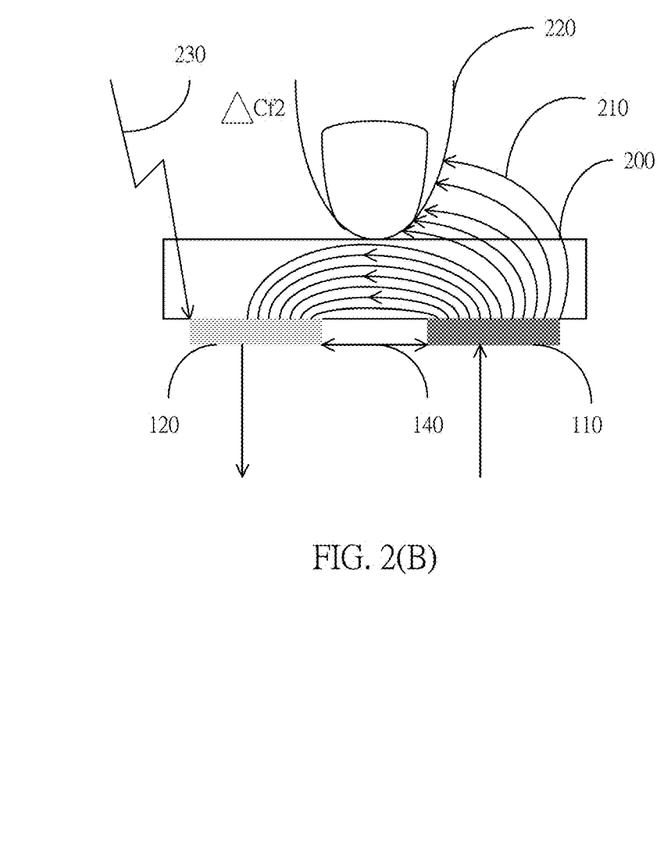

Referring to FIGS. 2(A) and (B), the fringe capacitance affected by an external conductive object according to some embodiments of the present invention is illustrated. Sectional views of a touch screen is depicted in FIGS. 2(A) and (B), the conductive sheets of the first electrode 110 and the second electrode 120, correspondingly, are under a surface glass 200 and there is a distance 140 between two of them. The touch sensitive processing apparatus provides driving signal to the first electrode 110, and then the second electrode 120 induces the driving signal and interfering noise 230 and transmits them back to the touch sensitive processing apparatus. As shown in FIG. 2(A), the driving signal extends from the first electrode 110 to the second electrode 120 by multiple electric force lines 210. Some of the electric force lines 210 are inside the surface glass 200 during all process, but some of them project outside the surface glass 200. All of the electric force lines 210 constitute the fringe capacitance Cf mentioned above.

It is notable that a lot of electric force lines 210 are depicted in FIGS. 2(A) and (B) but not every electric force line 210 carries the same electric power and it does not mean the range influenced by the electric force lines 210 only around the surface glass 200. In fact, the electric force lines 210 are limitless and the electric power carried by them can be represented by electric field strength or intensity. The electric force line 210 farther away from the surface glass 200 carries less electric power. Therefore, FIGS. 2(A) and (B) are just used to illustrate some embodiments for convenience, it does not mean the real electric field strength and the electric force lines are those shown in FIGS. 2(A) and (B).

Referring to FIG. 2(B), when an external conductive object 220, such as a finger, approximates the surface glass 200, some electric force lines 210 projected outside the surface glass 200 will be blocked by the external conductive object 220. Some electric power of the driving signal emitted by the first electrode 110 transmits to the external conductive object 220 and do not transmit to the second electrode 120. Accordingly, the fringe capacitance Cf and the mutual capacitance Cm have changes, and the touch sensitive processing apparatus can perform mutual capacitive detection according to the fringe capacitance's variation $\Delta Cf2$.

It is thus clear that when the noise 230 maintains constant and the variation $\Delta Cf2$ gets bigger, the signal-to-noise ratio (SNR, and thereinafter SNR) of the variation $\Delta Cf2$ and the noise 230 becomes bigger. In other words, when the external conductive object 220 blocks or touches more electric force lines 210, the electric power carried away by the external conductive object 220 gets more. This leads to the variation ΔCf2 getting bigger and thus the SNR getting bigger as well. On the other hand, when the external conductive object 220 blocks or touches less electric force lines 210, the electric power carried away by the external conductive object 220 gets less. This causes the variation ΔCf2 getting smaller and thus the SNR getting smaller too. When the SNR is big, the touch sensitive processing apparatus can detect the approximate event of the external conductive object easily, and conversely, when the SNR is small, it is difficult for the touch sensitive processing apparatus to detect the approximate event of the external conductive object.

Figure 3A:
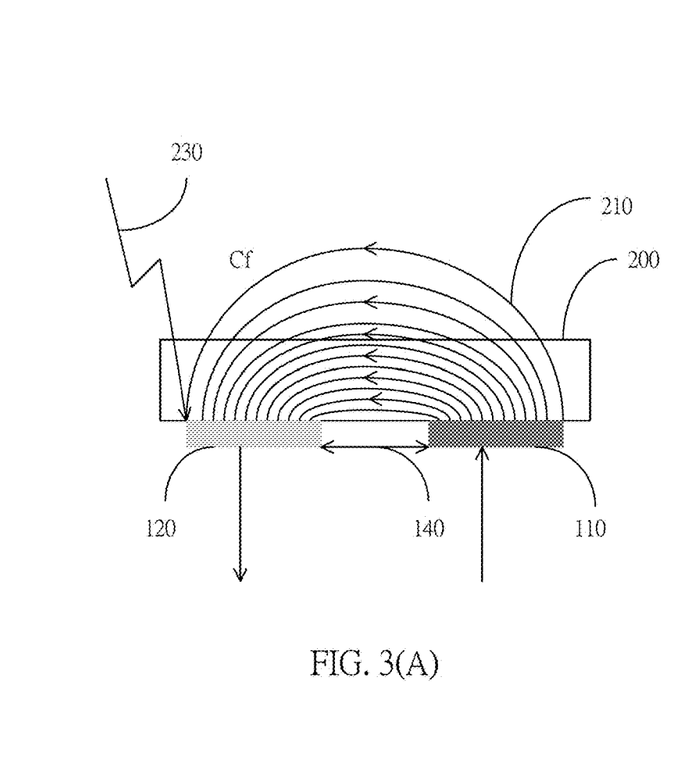
FIGS. 3(A) and 3(B) show an influence on fringe capacitance by an external conductive object according to some embodiments of the present invention.
Figure 3B:
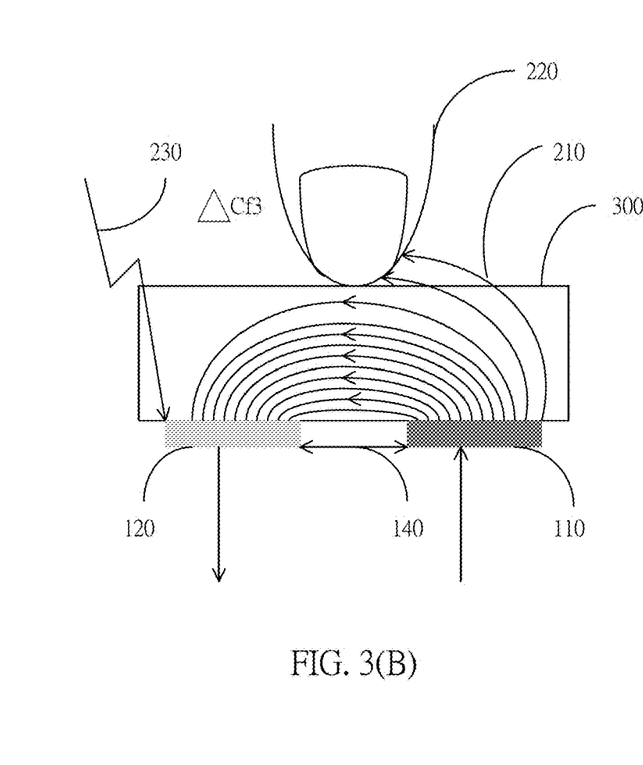

Referring to FIGS. 3(A) and (B), the fringe capacitance affected by an external conductive object according to some embodiments of the present invention is illustrated. FIG. 3(A) is the same as FIG. 2(A). FIG. 3(B) and FIG. 2(B) have the difference that the surface glass 300 in FIG. 3(B) is thicker than the surface glass 200 in FIG. 2(B). It is clear that the same external conductive object 220 blocks or touches less electric force lines 210, the electric power carried away by the external conductive object 220 will be less, and causing the variation ΔCf3 getting smaller, the SNR thus getting smaller. Other things being equal, the variation ΔCf3 of FIGS. 3(A) and (B) is smaller than the variation ΔCf2 of FIGS. 2(A) and (B) and the SNR gets worse.

Since modern people likes the visual effect brought by the big screen more and more, the size of the touch screen gets bigger increasingly. For supporting and maintaining the structural strength of the touch screen, when a harder glass is not equipped with, the large touch screen needs a thicker surface glass for withstanding deformation and other pressures. However, a harder glass will require more expensive cost; a thicker glass will make SNR worse and causes the function of mutual capacitive detection to be sacrificed.

Figure 4A:
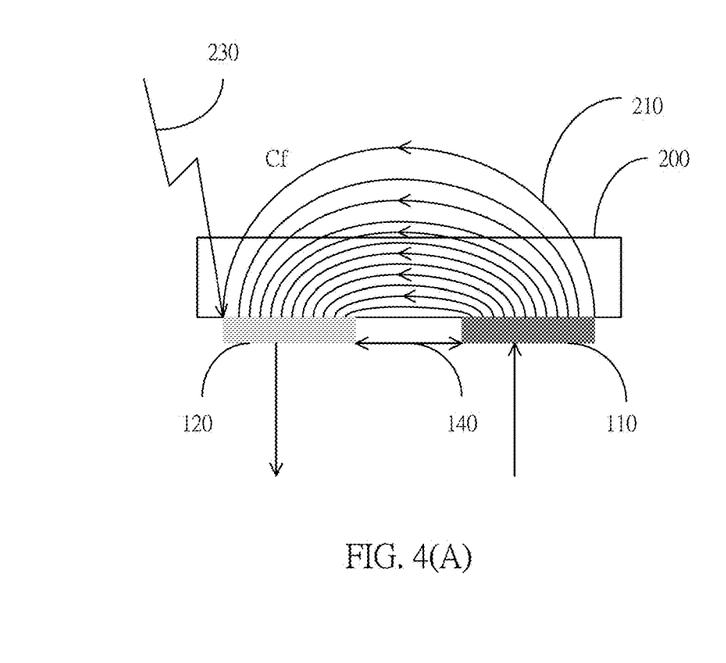
FIGS. 4(A) and 4(B) show an influence on fringe capacitance by an external conductive object according to some embodiments of the present invention.
Figure 4B:
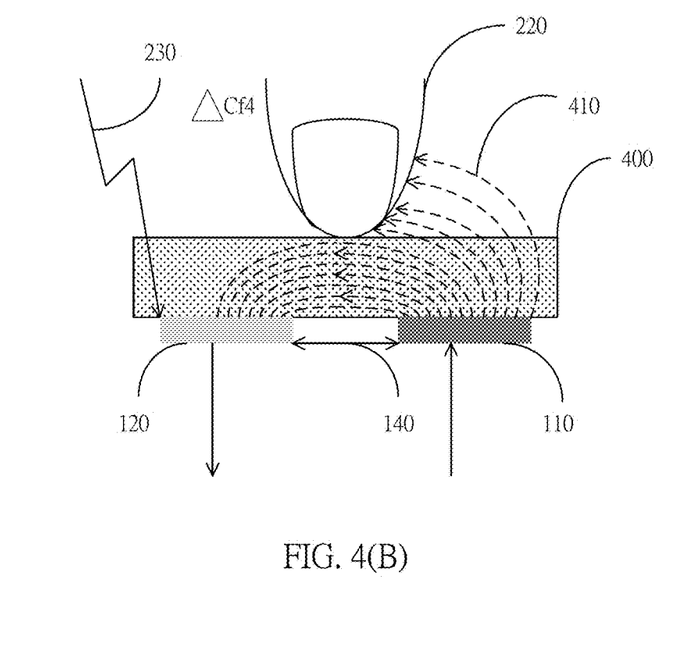

Referring to FIGS. 4(A) and (B), the fringe capacitance affected by an external conductive object according to some embodiments of the present invention is illustrated. FIG. 4(A) is the same as FIG. 2(A). FIG. 4(B) and FIG. 2(B) have the difference that FIG. 4(B) does not use the surface glass 200 but a covering layer 400 with using other transparent material. For example, the covering layer 400 may be one-layer structure, multi-layer structure, or non-layer complex structure. The covering layer 400 may be a film, a glass containing air layer, or other transparent material. The glass material also has several choices, such as Corning gorilla glass, borosilicate glass, sapphire glass, and etc.

The permittivity for general glass is about 7 and may be changed according to different frequencies. For example, such as a scratch-resistance tempered glass produced by Corning Inc. has the permittivity at 7.38 for the electromagnetic wave in frequency of 54 MHz, 7.30 for the electromagnetic wave in frequency of 912 MHz, and 7.19 for the electromagnetic wave in frequency of 2986 MHz. The gorilla glass produced by Corning Inc. has a permittivity of 9 being higher than general glasses, it can effectively improve SNR.

When the covering layer 400 is a film and the thickness thereof is the same as that of the glass 200, the electric power carried by the electric force lines 410 projected outside the covering layer 400 becomes less because the permittivity of the film is about one half of the permittivity of the glass with the same thickness. Although the electric force lines 410 blocked or touched by the external conductive object 220 are the same as those shown in FIG. 2, the capacitance variation ΔCf4 is smaller than the capacitance variation ΔCf2 of FIG. 2 due to the electric power getting less. Accordingly, the SNR gets worse.

Since the touch screens can be applied to the environments increasingly, when the electronic devices do not need the thick and heavy surface glass 200 in order to reduce the weight for carrying conveniently, and even allowing the screen being slightly bended, other transparent covering layers should be consider to replace the glass. As mentioned above, when the permittivity of the transparent covering layer 400 is smaller than that of the surface glass 200, the SNR gets worse and the function of mutual capacitive detection will be sacrificed. Conversely, when the permittivity of the transparent covering layer 400 is bigger than that of the surface glass 200, the SNR gets better and the function of mutual capacitive detection is also improved.

Figure 5A:
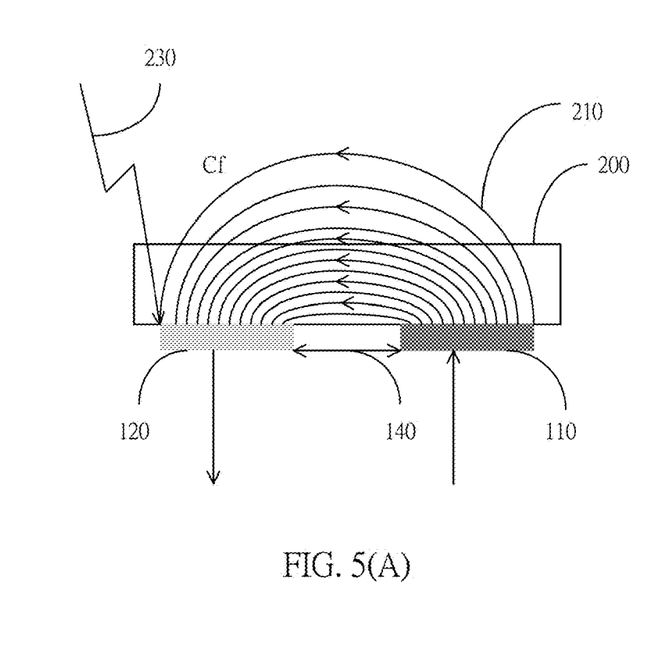
FIGS. 5(A) and 5(B) show an influence on fringe capacitance by an external conductive object according to some embodiments of the present invention.
Figure 5B:
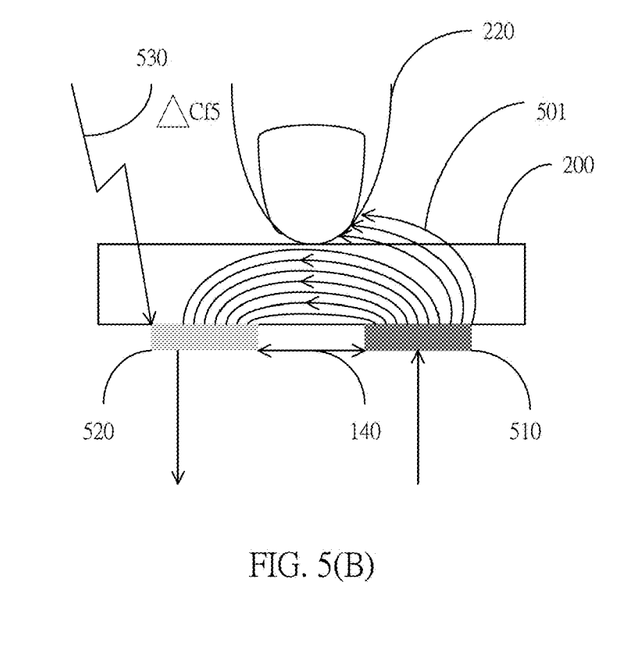

Referring to FIGS. 5(A) and (B), the fringe capacitance affected by an external conductive object according to some embodiments of the present invention is illustrated. FIG. 5(A) is the same as FIG. 2(A). FIG. 5(B) and FIG. 2(B) have the difference that the area of the first electrode 510 is smaller than that of the first electrode 110 and the area of the second electrode 520 is smaller than that of the second electrode 120. When the same driving signal is provided to the first electrode 510, since the area emitting the electric force lines 501 gets smaller, the electric force lines 501 blocked or touched by the external conductive object 220 get less as well. Accordingly, when external noise 530 is the same as that shown in FIG. 2(A), the capacitance variation ΔCf5 is smaller than the variation ΔCf2 of FIG. 2(B). Accordingly, the SNR becomes worse.

However, since the area of the second electrode 520 reduces, the received external noise 530 may also be less. Or, since the area reduces and the resistance thus increases, the permeated current of the external noise 530 also reduces. Even so, the effect got from this part whether to counteract the effect of the electric force lines getting less, it needs to be further study case by case.

Figure 6A:
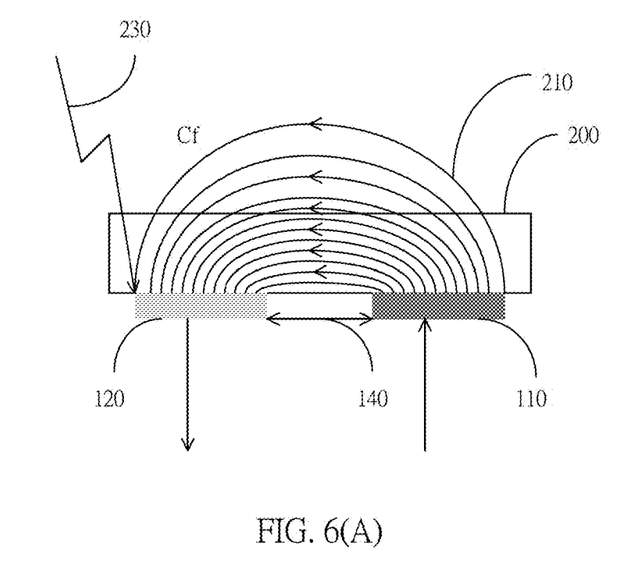
FIGS. 6(A) and 6(B) show an influence on fringe capacitance by an external conductive object according to some embodiments of the present invention.
Figure 6B:
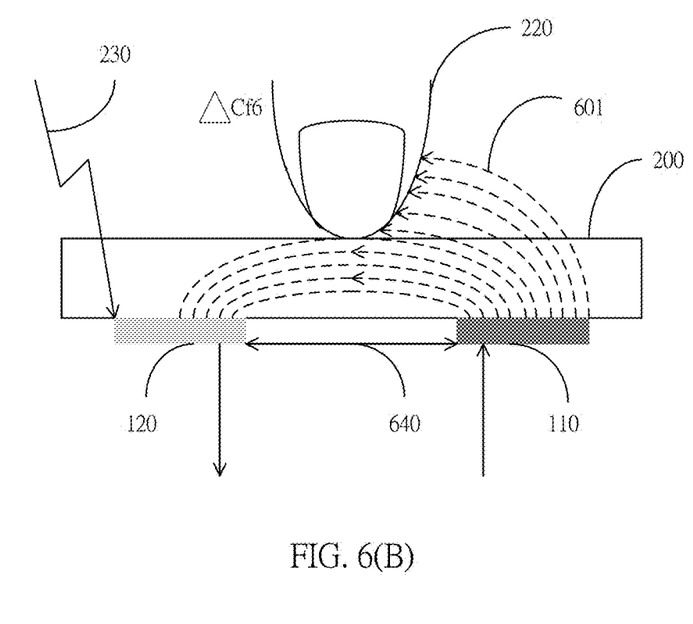

Referring to FIGS. 6(A) and (B), the fringe capacitance affected by an external conductive object according to some embodiments of the present invention is illustrated. FIG. 6(A) is the same as FIG. 2(A). FIG. 6(B) and FIG. 2(B) have the difference that the distance 640 between the first electrode 110 and the second electrode 120 is bigger than the distance 140 in FIG. 6(A). When the same driving signal is provided to the first electrode 110, there are more electric force lines 601 projected outside the surface glass 200 since the distance 640 between two electrodes is bigger. However, since the electric force lines 601 are generally longer than the electric force lines 210, the electric power carried by them would be weaker. When the distance 640 is in certain a suitable range, the increased electric force lines will counteract the effect of the electric power getting less. Accordingly, the electric power carried away by the external conductive object 220 would be bigger to make the capacitance variation ΔCf6 smaller than the variation ΔCf2. So, the SNR gets better.

Another method for improving the SNR, the touch sensitive processing apparatus may provide driving signal in higher voltage to the first electrode 110. This leads to the electric power carried by the electric force lines 210 projected outside the surface glass 300 gets bigger in order to improve the SNR. However, the driving signal in higher voltage needs to consume more energy and it is more difficult to be applied to the electronic devices supplied power by the battery.

In the abovementioned embodiments, it can be realized that there are several parameters affecting the fringe capacitance in the structure of mutual-capacitance touch screen. These parameters at least include the voltage of driving signal, the thickness of the covering layer, the permittivity of the covering layer, the area size of the touch sensitive electrode, the distance between the touch sensitive electrodes, and so on.

The structure design needs to compromise with all kinds of needs, and cannot completely satisfy certain a requirement. Through controlling the parameters of the shape and material of the first and the second electrodes, the voltage of driving signal, the permittivity of the covering layer, the area size of the touch sensitive electrode, applicant takes tests and gets the preferred relationship between the thickness of the covering layer and the distance between the touch sensitive electrodes as shown in the following table.

| The thickness of the surface glass (mm) | The distance between the first and the second electrodes (mm) |
|---|---|
| <=2 | 0.50 |
| 3 | 0.61 |
| 4 | 0.70 |
| 5 | 0.79 |
| 6 | 0.86 |
| 7 | 0.93 |
| 8 | 1.00 |

The preferred embodiments are not limited to the numbers in the table. The numbers have a flexible adjustment range. For example, when the thickness of glass is 3 mm, the distance between electrodes may include a range containing 0.61. In some embodiments, the range may be plus and minus 30% level distances. In this mentioned instance, the distance between electrodes may have 0.61+(0.7-0.61)× 30%=0.637 mm at maximum, and 0.61−(0.61-0.50)× 30%=0.577 mm at minimum. In some preferred embodiments, the range may be plus and minus 10% level distances.

On the other hand, when the distance is 0.61 mm, the thickness of surface glass may be in a range. In some embodiments, this range may be plus and minus 30% level distances. In the instance mentioned above, this range may be 2.7-3.3. In some preferred embodiments, this range may be plus and minus 10% level distances.

In some embodiments, the designer of the touch screen decides the thickness of glass according to the screen size and the character of the selected glass. In the meantime, he/she may calculate according to the table shown above to correspond to the preferred distance. For example, when the thickness of glass is 3.5 mm, he/she may use an interpolation to calculate that the preferred distance is 0.655 mm; when the thickness of glass is 4.7 mm, he/she may use an interpolation to calculate that the preferred distance is 0.763 mm; and so on.

When the covering layer is changed from surface glass to other material, the abovementioned table can be transformed according to the permittivity thereof. For example, when a general glass having the permittivity being 7 is changed to a gorilla glass having the permittivity being 9, the thickness may be seven ninths of the original thickness. Accordingly, the table shown above can be transformed to as the table shown below.

| The thickness of the gorilla glass (mm) | The distance between the first and the second electrodes (mm) |
|---|---|
| <=1.44 | 0.50 |
| 2.33 | 0.61 |
| 3.11 | 0.70 |
| 3.89 | 0.79 |
| 4.67 | 0.86 |
| 5.44 | 0.93 |
| 6.22 | 1.00 |

Similarly, the embodiments shown in the table, their thickness ranges or distance ranges have 30% level distances for flexible adjustment. In some preferred embodiments, their thickness ranges or distance ranges have 10% level distances for flexible adjustment.

Moreover, applicant finds a preferred structure embodiment for mutual-capacitance touch screen in the testes, that is, the distance between the first electrodes or the distance between the second electrodes is about 10 times of the distance between the first electrode and the second electrode. Taking FIG. 1 for example, the distance 130 between the first electrodes is 10 times of the distance 140 between the first electrode and the second electrode. Referring to the embodiments shown in the table:

| The thickness of the surface glass (mm) | The distance between the first electrodes or the second electrodes (mm) | The distance between the first electrode and the second electrode (mm) |
|---|---|---|
| <=2 | 5.00 | 0.50 |
| 3 | 6.12 | 0.61 |
| 4 | 7.07 | 0.70 |
| 5 | 7.91 | 0.79 |
| 6 | 8.66 | 0.86 |
| 7 | 9.35 | 0.93 |
| 8 | 10.00 | 1.00 |

Similarly, the 10 times relationship mentioned above also has a flexible adjustment range, for example, such as 8-12 times. In some preferred embodiments, it may be around 9-11 times. For example, when the thickness of glass is 3 mm, the distance between the first electrodes or between the second electrodes may be 8-12 time of 0.61 mm, that is, 4.88-7.32 mm. In some embodiments, it may be 9-11 times, that is, 5.49-6.71 mm.

In summary, applicant provides a better design for a mutual-capacitance touch screen. It makes a capacitive touch device have a better signal-to-noise ratio (SNR) when the capacitive touch device detects an external conductive object above or on the screen, in order to achieve a better detection accuracy.

The present invention provides a mutual-capacitance touch screen including multiple parallel first electrodes and multiple parallel second electrodes respectively coupled to a touch sensitive processing apparatus; and a covering layer for covering the first and the second electrodes, wherein a thickness of the covering layer and a third distance between one of the first electrodes and an adjacent second electrode form a third ratio range.

In some embodiments, a first distance between two adjacent first electrodes of the first electrodes and the third distance form a first ratio range.

In some embodiments, a second distance between two adjacent second electrodes of the second electrodes and the third distance form a second ratio range.

In some embodiments, the thickness of the covering layer and a permittivity of the covering layer form a liner relationship when the third ratio range maintains constant.

In some embodiments, when a permittivity of the covering layer is 7, the third ratio range is as the following table, wherein the third distance mapping to the thickness of the covering layer has an flexible adjustment range of 30% level distances, the thickness of the covering layer mapping to the third distance has an flexible adjustment range of 30% levels distances.

| Level | The thickness of the covering layer (mm) | The third distance (mm) |
|---|---|---|
| 1 | <=2 | 0.50 |
| 2 | 3 | 0.61 |
| 3 | 4 | 0.70 |
| 4 | 5 | 0.79 |
| 5 | 6 | 0.86 |
| 6 | 7 | 0.93 |
| 7 | 8 | 1.00 |

In some alternative embodiments, if the third distance is mapping to a N-th level, where N is a natural number from 2 to 6, the thickness of the covering layer is between an upper bound and a lower bound, where the lower bound is calculated as the thickness of the covering layer corresponding to the N-th level−((the thickness corresponding to the N-th level−the thickness corresponding to the N−1th)*30%), where the upper bound is calculated as the thickness of the covering layer corresponding to the N-th level+((the thickness corresponding to the N+1th level−the thickness corresponding to the N-th level)*30%).

In some alternative embodiments, if the thickness of the covering layer is mapping to a N-th level, where N is a natural number from 2 to 6, the third distance is between an upper bound and a lower bound, where the lower bound is calculated as the third distance corresponding to the N-th level−((the third distance corresponding to the N-th level−the third distance corresponding to the N−1th)*30%), where the upper bound is calculated as the third distance corresponding to the N-th level+((the third distance corresponding to the N+1th level−the third distance corresponding to the N-th level)*30%).

In some embodiments, the first or the second ratio range is about 8-12 times.

In some embodiments, the first and the second electrodes are on a same single transparent electrode layer.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A mutual-capacitance touch screen, comprising:
a plurality of first electrodes being parallel to each other and configured to couple to a touch sensitive processing apparatus, each one of the first electrodes comprises multiple first conductive sheets and multiple first conductive lines for connecting the first conductive sheets, each of the first conductive sheets having the same shape and area;
a plurality of second electrodes being parallel to each other and configured to couple to the touch sensitive processing apparatus, each one of the second electrodes comprises multiple second conductive sheets and multiple second conductive lines for connecting adjacent second conductive sheets, each of the second conductive sheets having the same shape and area, wherein each of the first conductive sheets and each of the second conductive sheets have the same shape and area, and the first conductive lines and the second conductive lines are perpendicular to each other; and
a covering layer for covering the first and the second electrodes, wherein a thickness of the covering layer and a third distance between one of the first conductive sheets of one of the first electrodes and an adjacent one of the second conductive sheets of one of the second electrodes is within a third ratio range,
wherein a first distance between any two adjacent first electrodes is fixed and a second distance between any two adjacent second electrodes is also fixed,
wherein when a permittivity of the covering layer is 7, the third ratio range is as the following table:

| Level | The thickness of the covering layer (mm) | The third distance (mm) |
|---|---|---|
| 1 | <=2 | 0.50 |
| 2 | 3 | 0.61 |
| 3 | 4 | 0.70 |
| 4 | 5 | 0.79 |
| 5 | 6 | 0.86 |
| 6 | 7 | 0.93 |
| 7 | 8 | 1.00. |

2. The mutual-capacitance touch screen of claim 1, wherein the first distance between two adjacent first electrodes of the first electrodes and the third distance is within a first ratio range.

3. The mutual-capacitance touch screen of claim 1, wherein the second distance between two adjacent second electrodes of the second electrodes and the third distance is within a second ratio range.

4. The mutual-capacitance touch screen of claim 1, wherein the thickness of the covering layer and a permittivity of the covering layer form a liner relationship when the third ratio range maintains constant.

5. The mutual-capacitance touch screen of claim 1,
wherein the third distance is mapping to a N-th level, where N is a natural number from 2 to 6, the thickness of the covering layer is between an upper bound and a lower bound,
where the lower bound is calculated as the thickness of the covering layer corresponding to the N-th level−((the thickness corresponding to the N-th level−the thickness corresponding to the N−1th)*30%),
where the upper bound is calculated as the thickness of the covering layer corresponding to the N-th level+((the thickness corresponding to the N+1th level−the thickness corresponding to the N-th level)*30%).

6. The mutual-capacitance touch screen of claim 1,
wherein the thickness of the covering layer is mapping to a N-th level, where N is a natural number from 2 to 6, the third distance is between an upper bound and a lower bound,
where the lower bound is calculated as the third distance corresponding to the N-th level−((the third distance corresponding to the N-th level−the third distance corresponding to the N−1th)*30%),
where the upper bound is calculated as the third distance corresponding to the N-th level+((the third distance corresponding to the N+1th level−the third distance corresponding to the N-th level)*30%).

7. The mutual-capacitance touch screen of claim 1, wherein the first and the second electrodes are on a same single transparent electrode layer.

* * * * *